US010315867B2

(12) United States Patent
Nguyen et al.

(10) Patent No.: US 10,315,867 B2
(45) Date of Patent: Jun. 11, 2019

(54) USING BIODEGRADABLE OILS FOR CONTROLLING DUST FROM ADDITIVE PARTICLES

(71) Applicant: Halliburton Energy Services, Inc., Houston, TX (US)

(72) Inventors: Philip D. Nguyen, Houston, TX (US); Corneliu Stanciu, Kingwood, TX (US); Loan K. Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/540,190

(22) PCT Filed: Jan. 27, 2015

(86) PCT No.: PCT/US2015/013059
§ 371 (c)(1),
(2) Date: Jun. 27, 2017

(87) PCT Pub. No.: WO2016/122456
PCT Pub. Date: Aug. 4, 2016

(65) Prior Publication Data
US 2018/0002122 A1  Jan. 4, 2018

(51) Int. Cl.
E21B 43/267    (2006.01)
B65G 69/18     (2006.01)
B08B 15/00     (2006.01)
C09K 8/42      (2006.01)
C09K 8/80      (2006.01)
E21B 33/14     (2006.01)
E21B 41/00     (2006.01)

(52) U.S. Cl.
CPC .............. B65G 69/18 (2013.01); B08B 15/00 (2013.01); C09K 8/42 (2013.01); C09K 8/805 (2013.01); E21B 33/14 (2013.01); E21B 41/00 (2013.01); E21B 43/267 (2013.01)

(58) Field of Classification Search
CPC ........ E21B 43/267; E21B 41/00; E21B 33/14; C09K 8/42; C09K 8/805; B65G 69/18; B08B 15/00
USPC ...................................... 166/280.2
See application file for complete search history.

(56) References Cited

U.S. PATENT DOCUMENTS

| 5,360,633 | A  | 11/1994 | Dean |
| 6,269,847 | B1 | 8/2001  | Ballu |
| 9,856,414 | B2* | 1/2018 | Sundaram .............. C09K 8/805 |
| 2005/0167105 | A1* | 8/2005 | Roddy .................. C04B 20/008 166/293 |
| 2006/0078685 | A1 | 4/2006 | Frankpitt |
| 2007/0294987 | A1 | 12/2007 | Hunsinger et al. |
| 2009/0238643 | A1 | 9/2009 | Pomerleau et al. |

(Continued)

Primary Examiner — Silvana C Runyan
(74) Attorney, Agent, or Firm — Thomas Rooney; C. Tumey Law Group PLLC

(57) ABSTRACT

Application of biodegradable oils to additive particles to control dusting. A method of reducing an amount of dust produced during transfer of additive particles comprising: treating at least some of the additive particles with one or more biodegradable oils; storing the additive particles; and transferring the additive particles prior to and after storage, wherein biodegradable oil reduces the amount of dust produced during at least one of the transfers of the additive particles.

16 Claims, 2 Drawing Sheets

(56) References Cited

U.S. PATENT DOCUMENTS

| | | | |
|---|---|---|---|
| 2010/0323932 A1* | 12/2010 | Bustos | C09K 8/26 |
| | | | 507/219 |
| 2012/0312170 A1 | 12/2012 | Noh et al. | |
| 2013/0065800 A1* | 3/2013 | McDaniel | C09K 8/805 |
| | | | 507/219 |
| 2013/0318934 A1 | 12/2013 | Stutzman et al. | |
| 2014/0137616 A1 | 3/2014 | Peacock et al. | |
| 2015/0119301 A1* | 4/2015 | McDaniel | C09K 8/805 |
| | | | 507/224 |
| 2017/0252716 A1* | 9/2017 | Nguyen | C09K 3/22 |

\* cited by examiner

USING BIODEGRADABLE OILS FOR CONTROLLING DUST FROM ADDITIVE PARTICLES

BACKGROUND

The present disclosure relates to controlling dusting from additive particles and, more particularly, to application of biodegradable oils to additive particles to control dusting.

There are a variety of industries that use additive particles that are prone to "dusting." "Dusting" may occur when particles are transferred or moved and smaller particulates or dust get stirred up and remain in the air instead of moving into the new container or location. Dusting may be quite problematic. In the oil and gas industry, for example, proppant is one type of additive particle that may commonly be used to prop fractures in an open position. A common proppant is sand. Sand is prone to dusting as the smaller silica particulates or dust tends to get stirred up into the air during transfer. The proppant may often be stored in a storage container, such as a silo, so the proppant is on-hand and readily available at the work site when needed for subterranean treatments. Dusting may generally occur when transferring the proppant into the storage container or removing the proppant from the storage container for use in the subterranean treatments.

In order to combat the problems of dusting, a liquid, such as water may be sprayed onto the particles before and/or during transfer of the particles. The liquid may help weight down the smaller particulates of dust and keep them from becoming stirred up or airborne. Moreover, equipment, such as a vacuum, may be used to suck the dust out of the air. However, some of the disadvantages to using a liquid to combat dusting is that the liquid may evaporate, which may leave the particulates susceptible to dusting during the next transfer. As a result, when a liquid is used, it is common to have to keep re-applying the liquid before or during each transfer of the particles. Additionally, equipment, such as a vacuum, may be expensive and cumbersome due to the physical size and handling of the equipment near the transfer area.

BRIEF DESCRIPTION OF THE DRAWINGS

The features and advantages of certain embodiments will be more readily appreciated when considered in conjunction with the accompanying figures. The figures are not to be construed as limiting any of the preferred embodiments.

DETAILED DESCRIPTION

Figure 1:
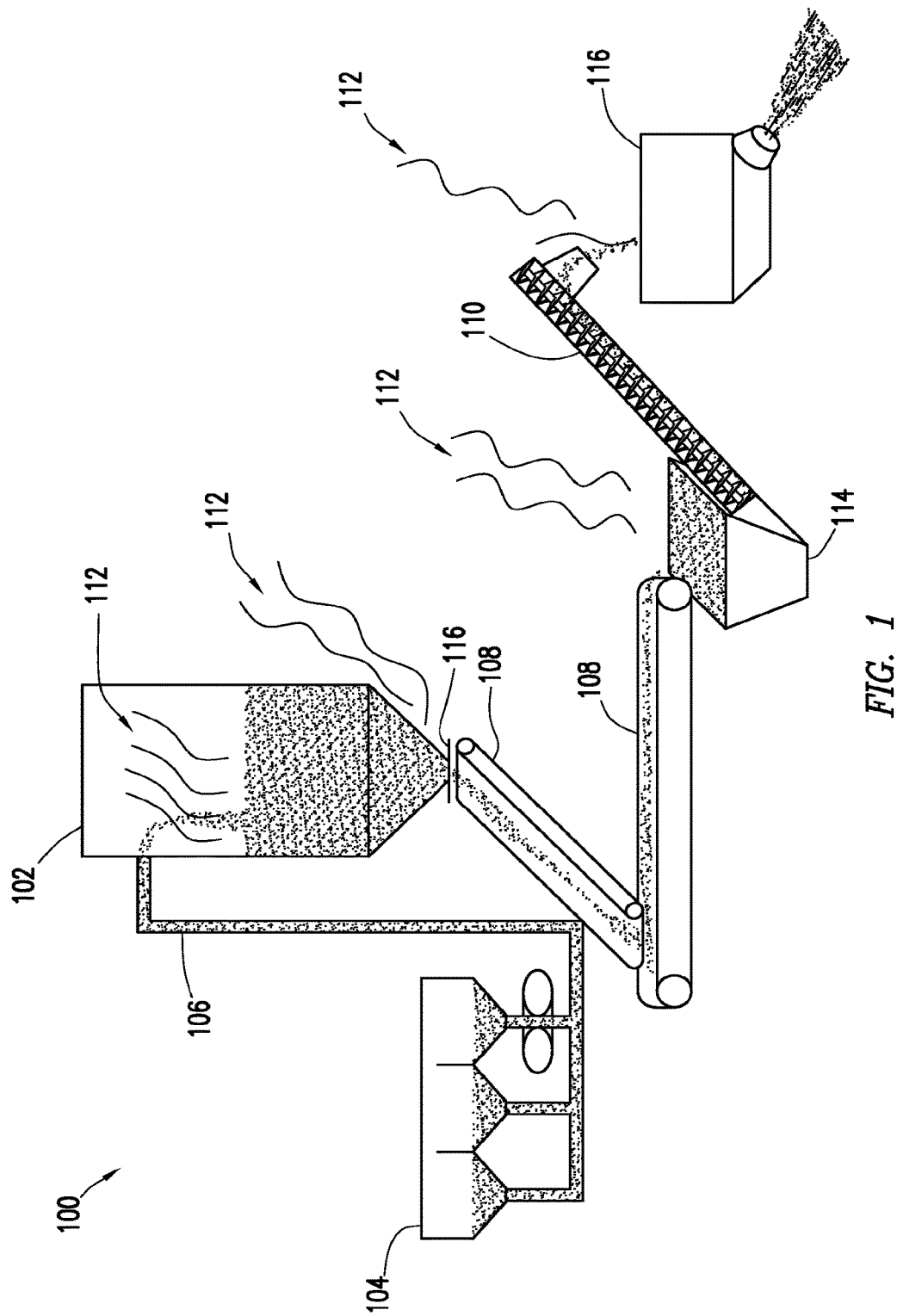
FIG. 1 is a schematic diagram of a system for transferring additive particles from a storage container to one or more mixing vessels.

The present disclosure relates to controlling dusting from additive particles. It has been discovered that biodegradable oils may be used to treat additive particles. Biodegradable oils may modify the surface of at least some of the additive particles in which particulates of dust may become stuck to or at least attracted to the particles such that the dust is less likely to become stirred up during transfer. Advantageously, additive particles treated with a biodegradable oil may only need to be treated one time because biodegradable oils should not evaporate like other liquids and/or biodegradable oils should be stable at temperatures up to 350° F. (177° C.) for several days to months without evaporating, degrading, or oxidizing, and cumbersome equipment may not be needed to combat the production of dust during transfers.

It is to be understood that the discussion of embodiments regarding additive particles, the storage container, or biodegradable oils are intended to apply to the method and system embodiments.

The additive particles may be any additive particles in a dry form that may be prone to dusting. Additive particles may be used in a variety of industries, including oil and gas, waste treatment, water treatment, mining, and construction. By way of example, additive particles may be used in oil and gas wellbore operations. Examples additive particles that may be used in oil and gas wellbore operations, for example, may include sand; bauxite; ceramic materials; glass materials; polymer materials; polytetrafluoroethylene (TEFLON®) materials; resin precoated sands; resin precoated proppants; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Sand may be especially prone to dusting. Additive particles may be included as "proppant" in fracturing treatments and "gravel" in gravel packing treatments. It should be understood that the term "particulate," as used in this disclosure, includes all known shapes of materials including substantially spherical materials, fibrous materials, polygonal materials (such as cubic materials) and mixtures thereof. Moreover, fibrous materials that may or may not be used to bear the pressure of a closed fracture, are often included in proppant and gravel treatments. It should be understood that the term "proppant," as used in this disclosure, includes all known shapes of materials including substantially spherical materials, fibrous materials, polygonal materials (such as cubic materials) and mixtures thereof.

The additive particles may be bulk particles, mesoscopic particles, nanoparticles, or combinations thereof. As used herein, a "bulk particle" is a particle having a particle size greater than 1 micron. As used herein, a "mesoscopic particle" is a particle having a particle size in the range of 1 micron to 0.1 micron. As used herein, a "nanoparticle" is a particle having a particle size of less than 0.1 micron. As used herein, the term "particle size" refers to the volume surface mean diameter ("Ds"), which is related to the specific surface area of the particle. The volume surface mean diameter may be defined by the following equation: $D_s=6/(\Phi_s A_w \rho_p)$, where $\Phi_s$=sphericity; $A_w$=specific surface area; and $\rho_p$=particle density. Typically, the additive particles may have a size in the range of from about 2 to about 400 mesh, U.S. Sieve Series. For example, the additive particles may have particles size distribution ranges are one or more of 6/12 mesh, 8/16, 12/20, 16/30, 20/40, 30/50, 40/60, 40/70, 50/70, 70/170, or 70/200. In some embodiments, the additive particles may have a particle size of 2, 20, 30, 40, 50, 60, 70, 80. 90, 100, 200, 300, or 400 mesh.

Turning to FIG. 1, a system 100 for transferring additive particles from a storage container to one or more mixing vessels is illustrated. The system 100 may include a storage container 102. The storage container 102 may be, for example, a silo or similar container that may be capable of storing a large amount of additive particles. The system 100 may further include a transport trailer 104. The transport trailer 104 may transport the additive particles to the storage container 102, for example, from a warehouse or manufacturing plant. The storage container 102 may be located at the work site (e.g., well site) where the additive particles are to be used. The storage container 102 containing the additive particles may also be transported to the work site. The additive particles may be transferred from the transport trailer 104 into the storage container 102 via a transfer device, such as a transfer tube 106, an open conveyor 108, or a closed conveyor 110. The additive particles may be prone to dusting during the transfer and create dust 112 outside or inside of the storage container 102.

The system 100 may also include one or more additional transfer devices, such as an open conveyor 108 (e.g., a conveyor belt) or a closed conveyor 110 (e.g., an auger screw device) to transfer the additive particles to one or more mixing apparatuses, such as dry ingredient mixing bin 114 or wet ingredient dry ingredient mixing tube 116. By way of example, the additive particles may be gravity fed from the storage container 102 onto an open conveyor 108 by opening a gate valve 116 located at the bottom of the storage container 102. The additive particles may then be transferred via the open conveyor 108 into a dry ingredient mixing bin 114 where other dry ingredients may be mixed with the additive particles. The dry mixture may then be additionally transferred via a closed conveyor 110, for example, into a dry and wet ingredient mixing tub 116 or other similar device wherein the dry ingredients may be mixed with one or more fluids to form a treatment fluid.

As illustrated in FIG. 1, at each transfer point before and after being placed into storage container 102 an amount of dust 112 may be produced. There may also be dust 112 produced at every transfer point. It is to be understood that FIG. 1 is merely illustrative of a system 100 in which dusting of additive problems may be problematic and that the present discussion is intended to encompass other configurations that may be used or the transfer of additive particles.

Reducing dust produced by the additive particles may be accomplished by coating the additive particles with a biodegradable oil, such as food-grade oils and synthetic oils. Examples of suitable food-grade oils may include vegetable oils, such as canola oil, coconut oil, corn oil, cottonseed oil, flaxseed oil, olive oil, palm oil, peanut oil, safflower oil, soybean oil, sunflower oil, or combinations thereof; nut oils, such as almond oil, beech nut oil, cashew oil, hazelnut oil, macadamia oil, mongongo oil, pecan oil, pine nut oil, pistachio oil, walnut oil, or combinations thereof; or citrus oils, such as grapefruit seed oil, lemon oil, orange oil, or combinations thereof. Examples of suitable synthetic oils may include polyalphaolefins (poly-1-hexene, poly-1-octene, etc), diesters (diisotridecyl adipate, etc), and polyalkylene glycols (mostly copolymers of ethylene and propylene oxide). Combinations of two or more suitable biodegradable oils may also be used. Biodegradable oils may be particularly useful for applying to additive particles due to their environmentally nature and/or ability to allow for the additive particles to remain dry during their application. Remaining dry may prevent the additive particles from sticking to one another during application, thus allowing the additive particles to remain free flowing even after application of the biodegradable oil. Application of the biodegradable oils to the additive particles may reduce the amount of dust produced within system 100 and/or during transportation of the additive particles.

The biodegradable oil may be used in a concentration sufficient to provide the desired dusting control within system 100 and/or transportation of the additive particles while also maintaining the flowability of the treated additives particles. For example, biodegradable oils may applied to the additive particles in a concentration in the range of about 0.01% to about 5% v/w, or about 0.05% to about 1% v/w, or about 0.05% to about 0.5% v/w, or about 0.1% to about 0.25% v/w.

The biodegradable oil may be dispersed or otherwise combined with a solvent. Suitable solvents may include environmentally solvents, such as terpenes or terpenoids. Examples of suitable terpenes or terpenoids may include one or more of dipentene (d-limonene), α-pinene, β-mircene, p-cimene, citronellolio, geraniale (citrale), nerol, beta-carotene, menthol, geraniol, farnesol, phytol, their homologs, derivatives, enantiomers, isomers including constitutional isomers, stereoisomerisms, regioisomers, geometric isomers, or combinations thereof.

The additive particles may be flowable prior to and after being treated with the biodegradable oil. As used herein, the term "flowable" means that the additive particles may flow, be poured, free flow under the force of gravity, be pumped, and conform to the outline of a container. In this manner, the additive particles may be pumped, for example, from transport trailer 102 and into storage container 102. The additive particles may also flow from storage container 102, for example by gravity feed, onto an open or closed conveyor, such as open conveyor 108.

Figure 2:
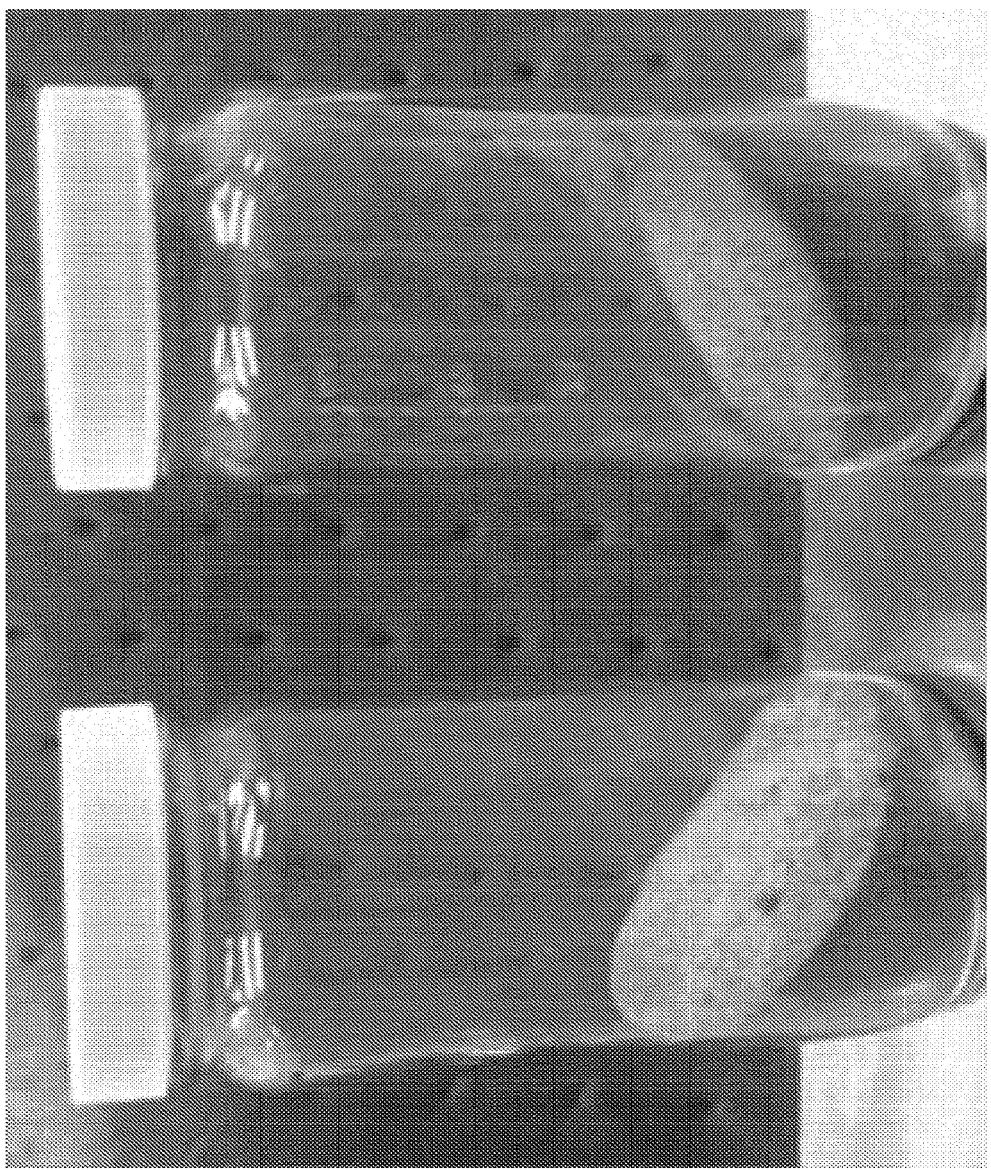
FIG. 2 is a photograph of untreated additive particles and additive particles that were treated with a biodegradable oil.

FIG. 2 is a photograph of untreated additive particle and treated additive particles. Specifically, the jar in the photograph on the left contains sand that has not been treated, while the jar on the right contains sand that have been treated with a biodegradable oil in an amount of 0.25% v/w., wherein "v/w" represents volume of the food source by mass of the additive particle. Both jars of the additive particle were contacted with the same pressure of air blown onto the sand through a tube. Dust was produced when the untreated particles were contacted with the air. By contrast, the sand that was treated with the biodegradable oil did not produce any visible dust when contacted with the air. In addition, the treated sand showed comparable flowability to the untreated sand without an increase in the angle of repose of the treated sand. This may indicate that the amount of dust may be controlled and possibly eliminated by treating additive particles with biodegradable oils while maintaining flowability of the additive particles.

The additive particles may be treated with the biodegradable oil at a variety of times. By way of example, the additive particles may be treated at any time prior to a transfer in which dust is likely to be produced. The additive particles may be treated prior to, during, or after transfer into storage container 102. By way of example, the additive particles may be treated at a manufacturing facility or when placed into transport trailer 10. The additive particles may also be treated as the additive particles are being transferred into storage container 102. By way of another example, the additive particles may be treated when leaving storage container 102, for example during gravity feeding onto open conveyor 108. The additive particles may also be treated before or after being transferred into a mixing apparatus, such as the dry ingredient mixing bin 114 or the dry and wet ingredient mixing tub 116, from the storage container 102. It may be advantageous to treat the additive particles as far up the chain as possible, for example prior to being transferred into storage container 102 or upon exiting the storage container 102. In this manner, the amount of dust 112 that is produced may be decreased as often as possible at each transfer point. This also eliminates the need to use other liquids, such as water, or equipment to try and reduce the amount of dust produced prior to treatment with the biodegradable oil. As such, the additive particles may be treated once and the amount of dust produced during each subsequent transfer may be reduced and possibly eliminated.

The methods may further include using the treated additive particles in an operation at the work site. The operation may be a subterranean treatment in an oil and gas well. For example, the treated additive particles may be used in or in conjunction with numerous subterranean treatments, including but not limited to cementing, fracturing, gravel packing, "frac-packing," screened completions, screenless completions, drilling, acidizing (e.g. matrix acidizing or fracture acidizing), conformance treatments (e.g., water control, relative permeability modifiers, etc.), other sand control applications (e.g. formation consolidation, near wellbore consolidation, etc.), fluid loss "pills", scale treatments, hydrate control treatments, and the like.

Subterranean treatments may include introducing a treatment fluid comprising a treated additive particle into a subterranean formation. The treated additive particle may comprise an additive particle that has been treated with a biodegradable oil as described above. Introduction in the subterranean formation includes introducing into the portion of the subterranean surrounding a wellbore in the subterranean formation, as well as introduction of the treatment fluid into a wellbore penetrating the subterranean formation. The additive particle may be deposited in the subterranean formation, among other purposes, to form a portion of a gravel pack and/or to hold open conductive channels or fractures within the subterranean formation (e.g., forming a "proppant pack" within a subterranean fracture). The treatment fluid may be introduced into the subterranean formation a fracturing pressure to create or enhance one or more fractures within the subterranean formation. "Enhancing" one or more fractures in a subterranean formation may include the extension or enlargement of one or more natural or previously created fractures in the subterranean formation.

Subterranean treatments may include a cementing operation that comprises introducing a cement composition comprising a treated additive particle into a subterranean formation and allowing the cement composition to set. The treated additive particle may comprise an additive particle that has been treated with a biodegradable oil as described above. The cement composition may set to form a hardened mass. The cement composition may set in an annular space between the walls of the wellbore and the exterior surface of the pipe string (e.g., casing, liners, expandable tubulars, etc.) disposed therein to thereby form an annular sheath of hardened, substantially impermeable cement (i.e., a cement sheath) that may support and position the pipe string in the wellbore, as well as bonding the exterior surface of the pipe string to the subterranean formation (or larger conduit). This process for cementing a pipe string in place may commonly be referred to as "primary cementing." Cement compositions also may be used in remedial cementing methods, for example, to seal cracks or holes in pipe strings or cement sheaths, to seal highly permeable formation zones or fractures, to place a cement plug, and the like.

A method of reducing an amount of dust produced during transfer of additive particles may be provided. The method may comprise: treating at least some of the additive particles with one or more biodegradable oils; storing the additive particles; and transferring the additive particles prior to and after storage, wherein biodegradable oil reduces the amount of dust produced during at least one of the transfers of the additive particles. The additive particles may be bulk particles, mesoscopic particles, nanoparticles, or combinations thereof. The additive particles may comprise at least one of the following: sand; bauxite; ceramic material; glass material; resin precoated sands; resin precoated proppants; polymer material; polytetrafluoroethylene material; nut shell pieces; seed shell pieces; cured resinous particulate comprising nut shell pieces; cured resinous particulate comprising seed shell pieces; fruit pit pieces; cured resinous particulate comprising fruit pit pieces; wood; composite particulates; or combinations thereof. The biodegradable oil may comprise a vegetable oil, a nut oil, a citrus oil, or a combination thereof. The biodegradable oil may comprise a polyalphaolefin, a diester, a polyalkylene glycol, or a combination thereof. The additive particles may be treated with the biodegradable oil in a concentration in the range of about 0.01% to about 5% volume by weight of the additive particles. The biodegradable oil may be in a solvent. The method may further comprise transferring the additive particles into a storage container prior to the step of storing. The additive particles may be treated prior to, during, or after transfer into the storage container. The additive particles may be transferred before and after the step of storing. The method may further comprise transferring the additive particles to one or more mixing apparatuses after the step of storing. The method may further comprise using the additive particles in an operation at a work site. The operation may be a subterranean treatment. The operation may be a hydraulic fracturing operation, and the method further comprises depositing the additive particles in one or more formation fractures as proppant. The additive particles comprise sand. The operation may be cementing, and the method further comprises introducing a cement composition comprising the additive particles into a subterranean formation.

A system for transferring additive particles may be provided. The system may comprise: additive particles; a storage container; and a biodegradable oil, wherein at least some of the additive particles are treated with the biodegradable oil, and wherein the biodegradable oil reduces an amount of dust that is produced during transfer of the additive particles into the storage container, from the storage container, or into and from the storage container. The system further comprises a transfer device to transfer the additive particles to the storage container or to one or more mixing apparatuses. The additive particles may be bulk particles, mesoscopic particles, nanoparticles, or combinations thereof. The additive particles may comprise at least one of the following: sand; bauxite; ceramic material; glass material; resin precoated sands; resin precoated proppants; polymer material; polytetrafluoroethylene material; nut shell pieces; seed shell pieces; cured resinous particulate comprising nut shell pieces; cured resinous particulate comprising seed shell pieces; fruit pit pieces; cured resinous particulate comprising fruit pit pieces; wood; composite particulates; or combinations thereof. The biodegradable oil may comprise a vegetable oil, a nut oil, a citrus oil, or a combination thereof. The biodegradable oil may comprise a polyalphaolefin, a diester, a polyalkylene glycol, or a combination thereof. The additive particles may be treated with the biodegradable oil in a concentration in the range of about 0.01% to about 5% volume by weight of the additive particles. The biodegradable oil may be in a solvent.

The biodegradable oils and additive particles disclosed herein may directly or indirectly affect one or more components or pieces of equipment associated with the preparation, delivery, recapture, recycling, reuse, and/or disposal of the disclosed biodegradable oils and additive particles. For example, the disclosed biodegradable oils and additive particles may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the disclosed biodegradable oils and additive particles. The disclosed biodegradable oils and additive particles may also directly or indirectly affect any transport or delivery equipment used to convey biodegradable oils and additive particles to a well site or downhole such as, for example, any transport vessels, conduits, pipelines, trucks, tubulars, and/or pipes used to fluidically move biodegradable oils and additive particles from one location to another, any pumps, compressors, or motors (e.g., topside or downhole) used to drive the biodegradable oils and additive particles into motion, any valves or related joints used to regulate the pressure or flow rate of biodegradable oils and additive particles, and any sensors (i.e., pressure and temperature), gauges, and/or combinations thereof, and the like. The disclosed biodegradable oils and additive particles may also directly or indirectly affect the various downhole equipment and tools that may come into contact with biodegradable oils and additive particles such as, but not limited to, drill string, coiled tubing, drill pipe, drill collars, mud motors, downhole motors and/or pumps, floats. MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

As used herein, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

What is claimed is:

1. A method of reducing an amount of dust produced during transfer of additive particles comprising:
    transferring the additive particles from a transport trailer, through a transfer tube, to a storage container;
    treating at least some of the additive particles, during the step of transporting the additive particles from a transport trailer, with one or more biodegradable oils, wherein the biodegradable oil comprises a synthetic oil selected from the group consisting of a polyalphaolefin, a diester, a polyalkylene glycol, and a combination thereof;
    storing the additive particles; and
    transferring the additive particles after storage, wherein biodegradable oil reduces the amount of dust produced during the step of transferring the additive particles after storage; and
    introducing the additive particles into a subterranean formation after the step of storing the additive particles.

2. The method according to claim 1, wherein the biodegradable oil further comprises a biodegradable oil selected from the group consisting of a vegetable oil, a nut oil, a citrus oil, and a combination thereof.

3. The method according to claim 1, wherein the additive particles are treated with the biodegradable oil in a concentration in the range of about 0.01% to about 5% volume by weight of the additive particles.

4. The method according to claim 1, wherein the additive particles are transferred before and after the step of storing.

5. The method according to claim 1, further comprising transferring the additive particles to one or more mixing apparatuses after the step of storing.

6. The method according to claim 1, wherein the additive particles are bulk particles, mesoscopic particles, nanoparticles, or combinations thereof.

7. The method according to claim 6, wherein the additive particles comprise at least material selected from the group consisting of include sand; bauxite; ceramic material; glass material; resin precoated sands; resin precoated proppants; polymer material; polytetrafluoroethylene material; nut shell pieces; seed shell pieces; cured resinous particulate comprising nut shell pieces; cured resinous particulate comprising seed shell pieces; fruit pit pieces; cured resinous particulate comprising fruit pit pieces; wood; composite particulates and combinations thereof.

8. The method according to claim 1, wherein the biodegradable oil is in a solvent.

9. The method of claim 8, wherein the solvent selected from the group consisting of d-limonene, α-pinene, β-mircene, p-cimene, citronellolio, geraniale, nerol, beta-carotene, menthol, geraniol, farnesol, phytol, and combinations thereof.

10. The method according to claim 1, further comprising transferring the additive particles into a storage container prior to the step of storing.

11. The method according to claim 10, wherein the additive particles are treated prior to, during, or after transfer into the storage container.

12. A method according to claim 1, further comprising using the additive particles in an operation at a work site.

13. The method according to claim 12, wherein the operation is cementing, and wherein the method further comprises introducing a cement composition comprising the additive particles into a subterranean formation.

14. The method according to claim 12, wherein the operation is a subterranean treatment.

15. The method according to claim 14, wherein the operation is a hydraulic fracturing operation, and wherein the method further comprises depositing the additive particles in one or more formation fractures as proppant.

16. The method according to claim 15, wherein the additive particles comprise sand.

* * * * *